United States Patent [19]

Morishita et al.

[11] Patent Number: 5,262,888
[45] Date of Patent: Nov. 16, 1993

[54] LIGHT SHUTTER DEVICE

[75] Inventors: Masazumi Morishita, Toyohashi; Hisamitsu Fukase; Masato Takenaka, both of Toyokawa, all of Japan

[73] Assignee: Minolta Camera Kabushiki Kaisha, Osaka, Japan

[21] Appl. No.: 723,458

[22] Filed: Jun. 28, 1991

[30] Foreign Application Priority Data

Jul. 4, 1990 [JP] Japan .................................. 2-178381

[51] Int. Cl.⁵ .............................................. G02F 1/01
[52] U.S. Cl. ..................................... 359/245; 359/894; 359/892
[58] Field of Search ......................... 359/245, 894, 892

[56] References Cited

U.S. PATENT DOCUMENTS

4,854,678 8/1989 Kitano et al. ........................ 350/356
4,887,104 12/1989 Kitano et al. ........................ 350/355

FOREIGN PATENT DOCUMENTS

52-121351 10/1977 Japan .
1-182069 7/1989 Japan .

OTHER PUBLICATIONS

Journal of Applied Physics, vol. 38, No. 4, Mar. 15, 1967.
The Journal of the Institute of Electronics, Information and Communication Engineers, vol. 58-C, No. 8, Aug., 1975.

Primary Examiner—Robert J. Pascal
Assistant Examiner—R. A. Ratliff
Attorney, Agent, or Firm—Price, Gess & Ubell

[57] ABSTRACT

A light shutter device having a plurality of chips of PLZT as arranged in a row and a transparent substrate to which the chips attached. Between each chip and the transparent substrate, a pair of spacing regulating members are provided as spaced by a distance not smaller than a width of a light transmitting portion of the chip. The chip is bonded to the transparent substrate with an adhesive at portions outside the pair of spacing regulating members.

20 Claims, 4 Drawing Sheets

LIGHT SHUTTER DEVICE

BACKGROUND OF THE INVENTION

1. Field of the Invention

The present invention relates to light shutter devices, and more particularly to light shutter devices comprising chips of electrooptical material.

2. Description of the Related Art

Light shutter devices are known in which PLZT or like electrooptical material is used. The light shutter device comprises a chip prepared from an electrooptical material and having a plurality of shutter windows, and drive circuits for applying voltage to electrodes arranged in corresponding relation to the shutter windows. The chip and the drive circuits are bonded to a transparent substrate with an adhesive.

The light shutter device described has the problem that the adhesive present between the chip of electrooptical material and the transparent substrate influences the light to be transmitted through the device. More specifically, bubbles present in the adhesive give rise to the phenomenon of diffracting or refracting the light. Such bubbles become incorporated into the adhesive applied to the lower surface of the chip of electrooptical material when the chip is attached to the transparent substrate, and it is difficult to avoid this.

It therefore appears favorable to apply the adhesive to the chip except at the light transmitting region when the chip of electrooptical material is to be bonded to the transparent substrate. However, if the adhesive is thus applied locally, the thickness of the adhesive coating is liable to involve variations, which will tilt the chip. If the chip is tilted, light is refracted when passing through the chip, failing to reach the desired position.

SUMMARY OF THE INVENTION

Accordingly, the main object of the present invention is to provide a light shutter device wherein the adhesive for attaching the chip of electrooptical material to the transparent substrate produces no influence on the light to be transmitted through the chip.

Another object of the present invention is to provide a light shutter device wherein the chip of electrooptical material is attached to the transparent substrate accurately.

Still another object of the present invention is to provide a light shutter device which is easy to fabricate.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DESCRIPTION OF THE PREFERRED EMBODIMENTS

Embodiments of the present invention will be described below with reference to the drawings.

Figure 1:
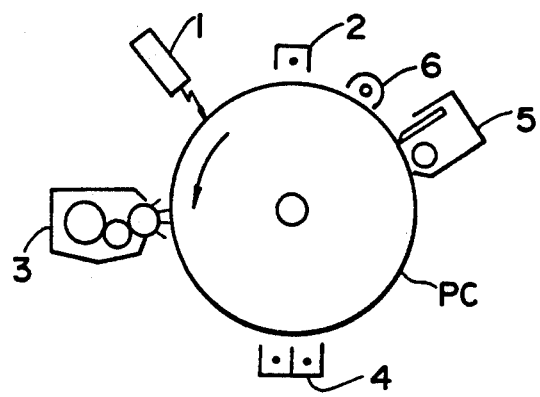
FIG. 1 is a diagram schematically showing the construction of an electrostatic printer.

FIG. 1 is a diagram showing the image forming assembly of an electrostatic printer. A printing head 1 has incorporated therein a light shutter device embodying the present invention.

Provided around a photoconductive member PC are a sensitizing charger 2, printing head 1, developing unit 3, transfer-separation charger 4, cleaner 5 and eraser 6, which are arranged in this order in the direction of rotation of the photoconductive member PC.

The photoconductive member PC is charged by the charger 2 and exposed to light selectively in minute pixel units by the operation of the printing head 1 in accordance with image data, whereby an electrostatic latent image is formed on the member PC. A charged toner is adhered by the developing unit 3 to the unexposed area of the latent image on the photoconductive member PC to convert the latent image to a visible toner image. The toner image is then transferred onto recording paper by the transfer-separation charger 4 and thereafter fixed to the paper by a fixing unit (not shown). On the other hand, the residual toner is removed from the photoconductive member PC by the cleaner 5, and the residual charge is removed from the member PC by the eraser 6 to complete a cycle of image forming process.

Figure 2:
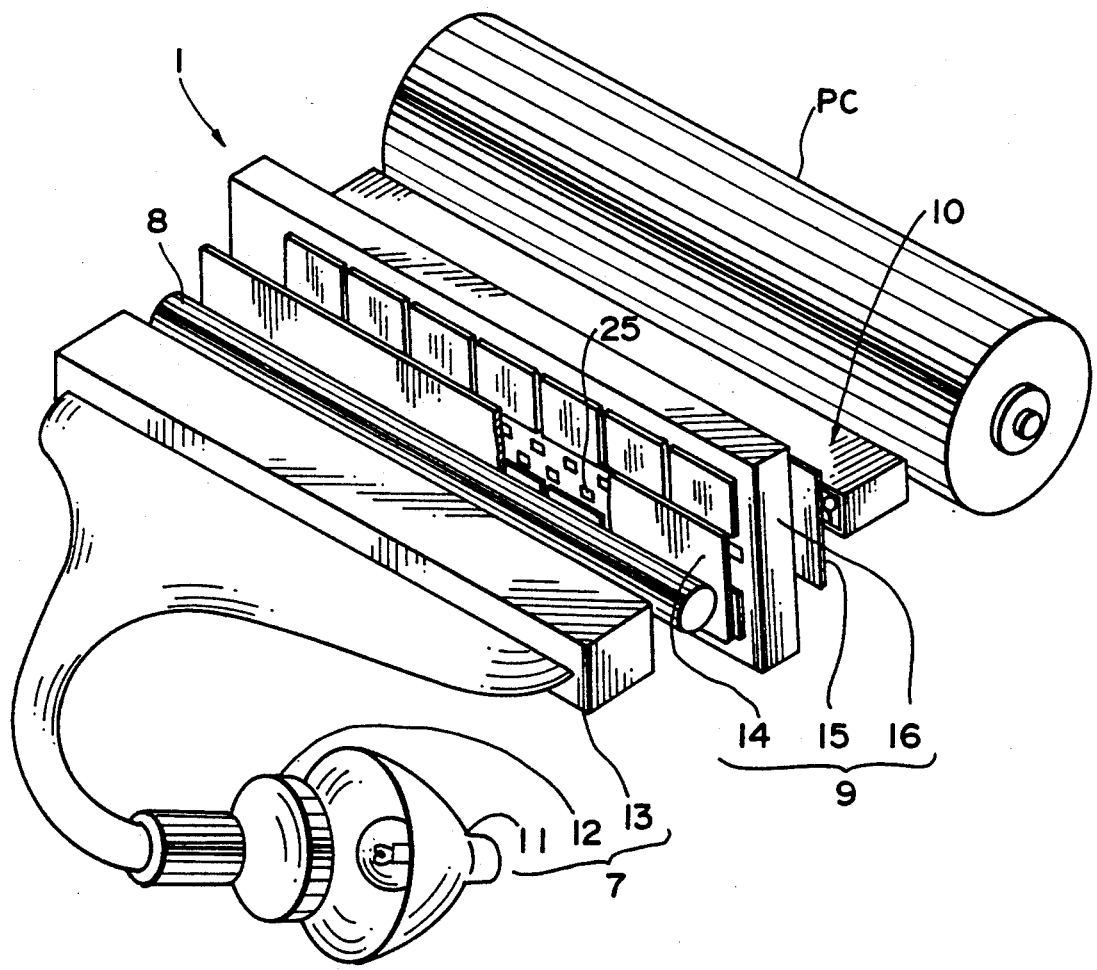
FIG. 2 is a perspective view showing the construction of a printing head included in the printer shown in FIG. 1.

With reference to FIG. 2, the printing head 1 comprises a light-emitting unit 7, a rod lens 8 for concentrating a beam from the light-emitting unit 7, the above-mentioned light shutter device 9 for selectively transmitting the light from the rod lens 8, and a rod lens array 10 for converging the light transmitted through the light shutter device 9.

The light-emitting unit 7 comprises a halogen lamp 11 serving as a point light source, a heat absorbing filter 12, and an optical fiber light guide 13 for converting the light from the point light source to a beam.

The light shutter device 9 comprises a polarizer 14 for passing therethrough only the light having a predetermined angle of polarization, a shutter 16 prepared with use of PLZT, and an analyzer 16 for passing therethrough only the light having an angle of polarization perpendicular to the polarization angle of the light passing through the polarizer 14.

Figure 3:
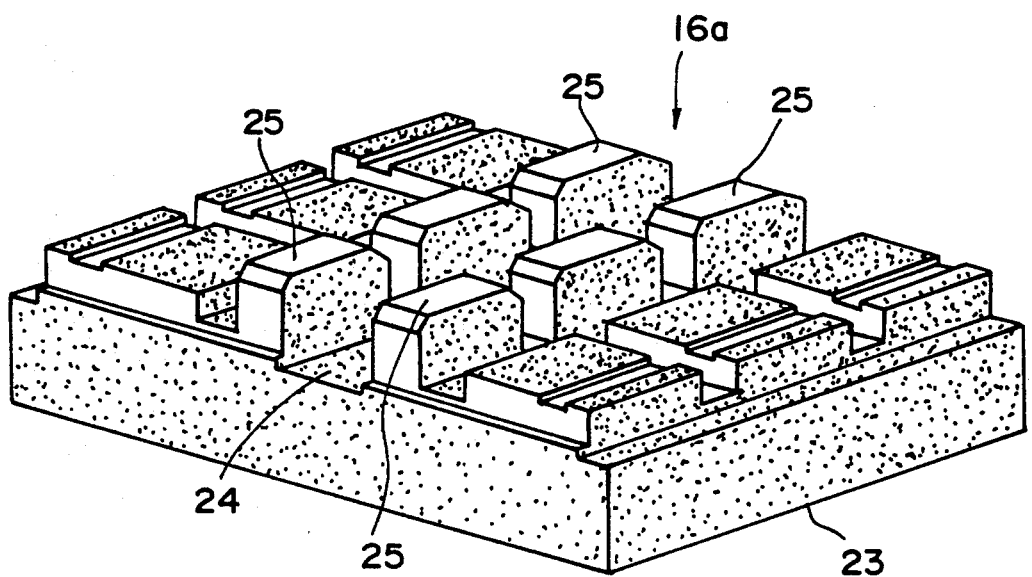
FIGS. 3 and 4 are respectively a perspective view and a plan view showing a chip of electrooptical material included in the printer.
Figure 4:
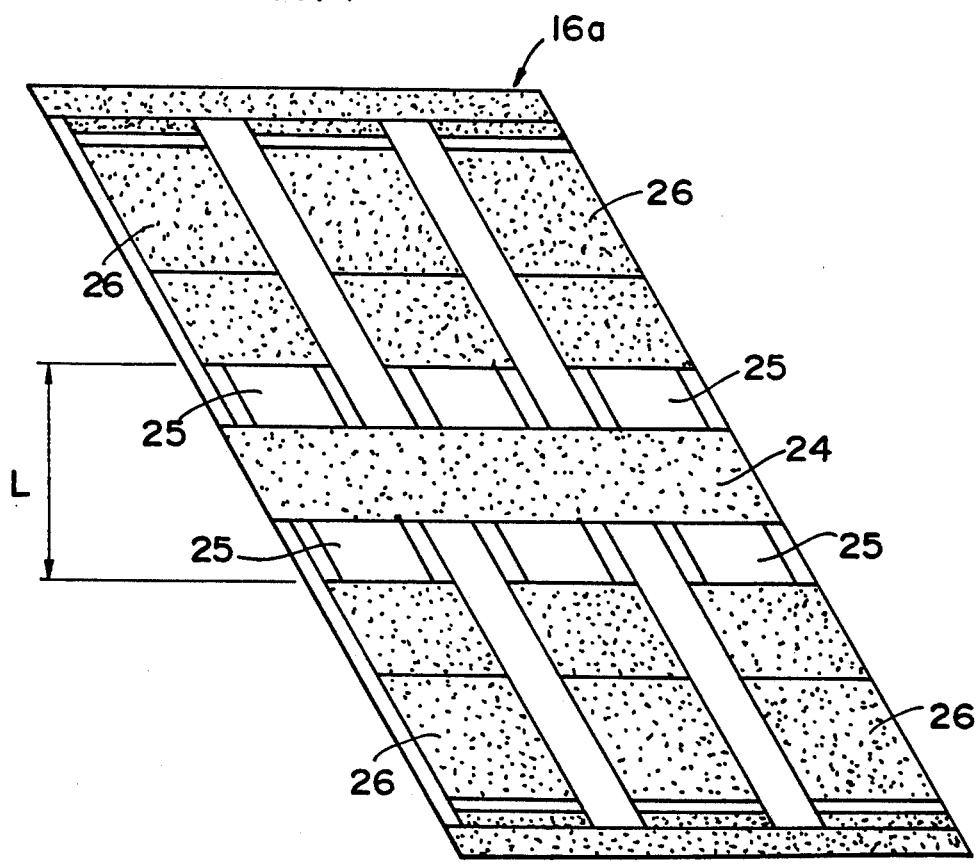

The shutter 16 comprises a plurality of chips 16a of PLZT as arranged in a row. As shown in FIGS. 3 and 4, each of the chips 16a is prepared from a PLZT wafer 23 by micromachining and comprises a common electrode 24 in the center, a plurality of shutter elements 25 provided at opposite sides of the common electrode 24, and individual electrodes 26 provided individually for the respective shutter elements 25. To apply voltage to the shutter element 25, the common electrode 24 and the individual electrode 26 extend at the opposed sides of the shutter element 25. The top surface of the shutter element 25 serves as a shutter window. When voltage is applied to the shutter element 25, the polarization angle of light passing through the polarizer 14 is rotated by the passage of the light through the shutter element 25, so that the light passes through the analyzer 15. Unless voltage is applied to the shutter element 25, the polarization angle of the light passing through the polarizer 14 is not rotated, so that the light is blocked by the analyzer 15. Accordingly, voltage is applied to the individual electrodes 26 for those of the shutter elements 25 through which the light is to be transmitted. The application of voltage to the shutter elements 25 is controlled by drive ICs 27 (FIG. 5) each disposed at each of the lateral sides of one chip 16a.

The plurality of shutter elements 25 are in a staggered arrangement in two rows when seen from the front. The two rows of shutter elements 25 are driven with a time lag, whereby the photoconductive member PC is exposed to light linearly longitudinally thereof.

Incidentally, the shutter 16 is described in detail in U.S. Pat. No. 4,854,678 and U.S. Pat. No. 4,887,104.

Figure 5:
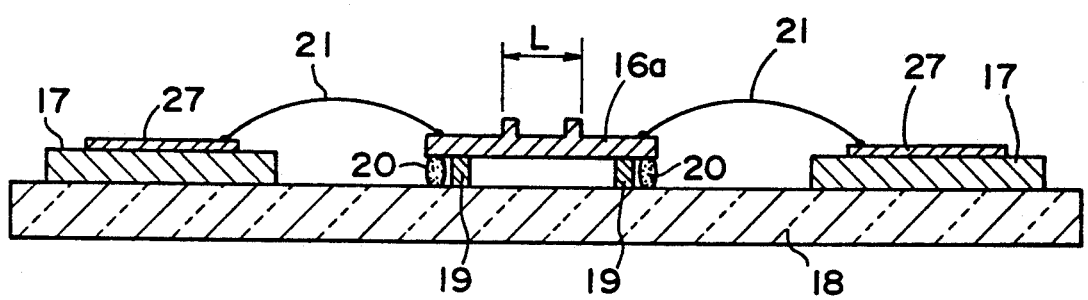
FIG. 5 is a sectional view of a light shutter device embodying the invention.

The chips 16a are attached to a transparent base plate 18 along with ceramic substrates 17 having mounted thereon the drive ICs 27 connected to the individual electrodes 26 by bonding wires 21 as shown in FIG. 5. Between each chip 16a and the transparent base plate 18, a pair of spacing regulating members 19 are provided as spaced apart by a distance not smaller than the width of the light transmitting portion of the chip 16a, i.e., the distance (indicated at L in FIG. 4) between the outer side edges of the two rows of shutter elements 25. The chip 16a is bonded to the transparent base plate 18 with an adhesive 20 at the chip portions outside the pair of spacing regulating members 19, i.e., opposite to the light transmitting portion.

The pair of spacing regulating members 19 are prepared from a resin film which is curable with light and affixed to the base plate 18, by exposing the film to light for curing and removing the unnecessary portion from the film. Since the resin film is available with a uniform thickness, there is no difference in thickness between the pair of spacing regulating members 19. The chip 16 can therefore be attached in a tilt-free posture to the transparent base plate 18. Furthermore, the adhesive 20 for bonding the chip 16a to the base plate 18 is positioned on opposite side of the light transmitting portion with respect to each spacing regulating member 19, so that no portion of the adhesive 20 enters the light transmitting portion, precluding light from being adversely affected by the adhesive 20.

Examples of materials useful for the light shutter device 9 are as follows. The transparent base plate 18 is useful insofar as it is a transparent plate of glass, acrylic resin, ABS resin, polycarbonate resin or the like. The ceramic substrate 17 can be made of alumina, glass-epoxy resin, bakelite, polyimide or like material which is used for usual printed boards.

On the other hand, the adhesive 20 is preferably a silicone or acrylate adhesive which is elastic and curable with light (e.g., with ultraviolet rays). Adhesives which are curable at room temperature require much time for curing, and those thermally curable need heating, which is likely to produce strain in the chip 16a, whereas the light-curable adhesive is free of these problems and can be irradiated with light from below the transparent base plate 18, hence greater freedom. Further if the adhesive used is one which retains elasticity after curing, the distortion of the base plate 18 and the chip 16a relative to each other can be eliminated by the adhesive which absorbs the difference in thermal expansion therebetween. To diminish the strain or distortion, it is desired to position the adhesive 20 away from the spacing regulating member 19 as illustrated.

Figure 6:
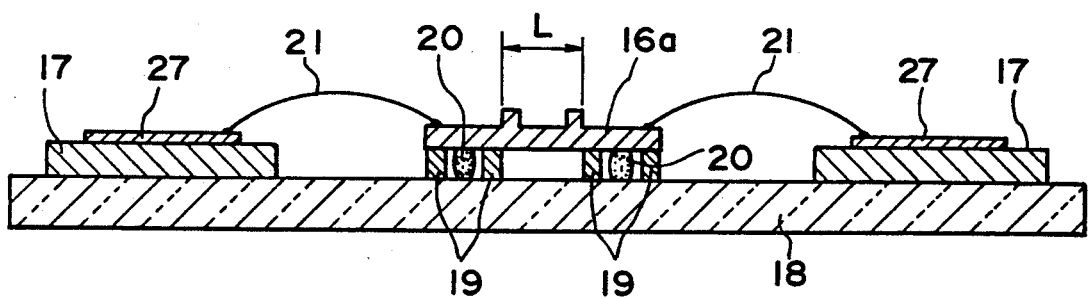
FIG. 6 is a sectional view of another light shutter embodying the invention.

It is desirable to use a light-curable dry film, for example, of the acrylate type for the spacing regulating member 19 as already stated, and to make the member 19 by photoetching. The regulating member 19 can then be formed at the desired position in the desired shape. Sufficient rigidity can be given to the light shutter device 9 by using a material of relatively high rigidity for the spacing regulating member 19. The rigidity serves to ensure stabilized wire bonding. When wire bonding is done by ultrasonic welding, the wire, which may be bonded to the position opposite to the adhesive 20, is preferably positioned as opposed to the spacing regulating member 19 so as to diminish the loss of ultrasonic energy. This assures a more stabilized wire bonding operation. Further if it is possible to strictly control the amount of adhesive 20 to be applied, each of the pair of spacing regulating members 19 may be provided in two rows to interpose the adhesive 20 therebetween as seen in FIG. 6.

Next, the work process will be described briefly with reference to an exemplary case wherein typical materials are used.

First, an ultraviolet-curable dry film for forming the spacing regulating members 19 is affixed to an acrylic resin plate serving as the transparent base plate 18. The dry film is then exposed to ultraviolet rays and thereafter developed to form the regulating members 19 on the acrylic resin plate. The resin plate is transported by a pallet for automatic transport, as placed thereon in position, and an ultraviolet-curable adhesive for bonding the ceramic substrates 17 is applied to the plate by screen printing. Next, the ceramic substrates 17 of glass-epoxy resin are placed in position on the resin plate, i.e., on the transparent base plate 18, and held thereto with clamps to prevent any rise or movement. The discharge orifices of an applicator adapted to apply an ultraviolet-curable adhesive are positioned on the outer sides of two regulating members 19 and caused to apply the adhesive 20 while being moved along at a given speed. The chips 16a are then placed in position on the spacing regulating members 19. In this state, the assembly is irradiated with ultraviolet rays from below the transparent base plate 18 to bond the ceramic substrates 17 and the chips 16a to the base plate 18. Wire bonding thereafter follows to complete a shutter device.

The adhesive for bonding the ceramic substrate 17 need not be the same as the adhesive for bonding the chip 16a. Although the spacing regulating members 19 can be formed by the injection molding of plastics instead of affixing the dry film, the above-mentioned step is desirable to assure the device of stabilized performance.

Figure 7:
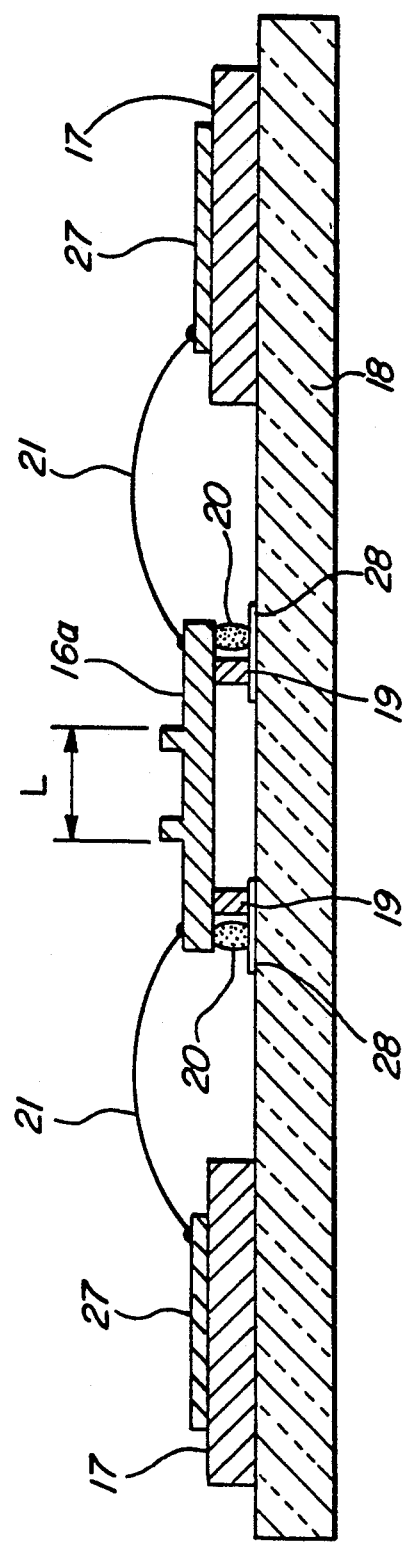
FIG. 7 is a sectional view of still another light shutter device embodying the invention.

Since PLZT or like electrooptical material has temperature characteristics, a problem is encountered in that variations in temperature result in variations in the quantity of light to be transmitted through the light shutter device. To overcome this problem, a heater may be provided for maintaining the shutter 16 at a constant temperature at all times. When the heater is provided directly on the transparent base plate 18, a heater pattern 28 of gold or like metal is formed on the upper surface of the transparent base plate 18, and the spacing regulating members, 19 are provided on the heater pattern as shown in FIG. 7. The heater pattern may be formed only over the areas where the regulating members 19 are provided. Alternatively, the heater pattern can be formed on the lower surface of the base plate 18. Voltage is applied to the heater pattern in accordance with the temperature detected by a thermistor, causing the heater pattern to generate heat for maintaining the shutter 16 at the constant temperature.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light shutter device comprising:
   a chip of an electro-optical material having a light transmitting portion through which light passes;
   a transparent substrate;
   a pair of spacing regulating members having upper surfaces provided between the chip and the transparent substrate and located at opposite sides of the light transmitting portion to directly contact and support the chip on their upper surfaces at a predetermined distance above the transparent substrate; and
   an adhesive provided between and in contact with both the chip and the transparent substrate and outside the pair of spacing regulating members with respect to a direction parallel to a surface of the transparent substrate for bonding the chip directly to the transparent substrate.

2. A light shutter device as claimed in claim 1, further comprising a driving circuit disposed on the transparent substrate.

3. A light shutter device as claimed in claim 1, wherein the pair of spacing regulating members are prepared from a resin film.

4. A light shutter device as claimed in claim 1, wherein the adhesive has elasticity.

5. A light shutter device as claimed in claim 1, wherein the adhesive is positioned away from each spacing regulating member.

6. A light shutter device as claimed in claim 1, further comprising another pair of spacing regulating members provided between the chip and the transparent substrate and located outside the adhesive.

7. A light shutter device comprising:
   a chip of an electro-optical material having a light transmitting portion through which light passes;
   a transparent substrate;
   spacing regulating means provided on the transparent substrate for directly supporting the chip at opposite sides of the light transmitting portion; and
   bonding means provided between and in contact with both said chip and said transparent substrate and outside the spacing regulating means so as to be away from the portion of the transparent substrate corresponding to the light transmitting portion for bonding the chip directly to the transparent substrate.

8. A light shutter device as claimed in claim 7, further comprising a driving circuit disposed on the transparent substrate.

9. A light shutter device as claimed in claim 7, wherein the spacing regulating means includes a resin film.

10. A light shutter device as claimed in claim 7, wherein the bonding means includes an elastic adhesive.

11. A light shutter device as claimed in claim 7, wherein the bonding means is positioned away from the spacing regulating means.

12. A light shutter device as claimed in claim 7, further comprising another spacing regulating means provided between the chip and the transparent substrate and located outside the bonding means.

13. An improved light shutter assembly for controlling the transmission of light comprising:
    a chip of an electrooptical material having a light transmitting portion;
    a transparent substrate having a heater pattern formed on the substrate to provide a source of heat, and
    means for mounting the chip above the transparent substrate whereby the light transmitting portion is offset from the transparent substrate.

14. The light shutter assembly of claim 13 wherein the means for mounting includes spacers extending between the chip and the substrate and an adhesive extending between the chip and the substrate.

15. The light shutter assembly of claim 13 wherein the adhesive is between a pair of spacers.

16. A method of forming a light shutter chip support structure comprising the steps of;
    providing a transparent base plate;
    positioning spacers on the transparent base plate with upper surfaces;
    providing adhesive means, on the transparent base plate, for securing a light shutter chip adjacent only outside surfaces of the spacers, and
    positioning a light shutter chip directly on the upper surfaces of the spacers with the adhesive means contacting and securing the light shutter chip, whereby a portion of the transparent base plate between the spacers will be free from any adhesive that could adversely affect the transmission of light.

17. The method of claim 16 wherein the positioning of spacers includes applying a dry film to the transparent plate and developing the film with images to form the spacers.

18. The method of claim 16 wherein the adhesive means includes an ultraviolet curable adhesive and the positioning step includes curing the adhesive with ultraviolet rays through the transparent base plate.

19. The method of claim 16 further including the step of applying a heat producing member on the base plate.

20. A light shutter device comprising:
    a chip of an electro-optical material having a light transmitting portion through which light passes;
    a transparent substrate;
    spacing regulating means provided on the transparent substrate for directly supporting the chip at opposite sides of the light transmitting portion; and
    adhesive bonding means provided between and in contact with both said chip and said transparent substrate at only locations outside the spacing regulating means, relative to the light transmitting portion, for bonding the chip directly to the transparent substrate including an ultraviolet cured adhesive.

* * * * *